US012614409B2

(12) United States Patent
Lee et al.

(10) Patent No.: US 12,614,409 B2
(45) Date of Patent: **\*Apr. 28, 2026**

(54) METHOD AND APPARATUS FOR FACE DETECTION USING ADAPTIVE THRESHOLD

(71) Applicant: Samsung Electronics Co., Ltd., Suwon-si (KR)

(72) Inventors: Seohyung Lee, Seoul (KR); Jaehyoung Yoo, Seongnam-si (KR); Jinwoo Son, Seoul (KR); Changyong Son, Anyang-si (KR); Sangil Jung, Yongin-si (KR); Changin Choi, Suwon-si (KR)

(73) Assignee: Samsung Electronics Co., Ltd., Suwon-si (KR)

( \* ) Notice: Subject to any disclaimer, the term of this patent is extended or adjusted under 35 U.S.C. 154(b) by 362 days.

This patent is subject to a terminal disclaimer.

(21) Appl. No.: 18/197,265

(22) Filed: May 15, 2023

(65) Prior Publication Data

US 2023/0282024 A1 Sep. 7, 2023

Related U.S. Application Data

(63) Continuation of application No. 17/075,164, filed on Oct. 20, 2020, now Pat. No. 11,688,199.
(Continued)

(30) Foreign Application Priority Data

Mar. 5, 2020 (KR) ........................ 10-2020-0027948

(51) Int. Cl.
*G06V 40/16* (2022.01)

(52) U.S. Cl.
CPC ................................. *G06V 40/161* (2022.01)

(58) Field of Classification Search
CPC .................................................... G06V 40/161
See application file for complete search history.

(56) References Cited

U.S. PATENT DOCUMENTS 8,873,840 B2 10/2014 Krupka et al.
9,892,324 B1 2/2018 Pachauri
(Continued)

FOREIGN PATENT DOCUMENTS

CN 106981201 A 7/2017
CN 109409365 A 3/2019
(Continued)

OTHER PUBLICATIONS

Chinese Office Action issued on Nov. 28, 2024, in counterpart Chinese Patent Application No. 202011140031.9 (15 pages in English, 9 pages in Chinese).

*Primary Examiner* — Ayodeji O Ayotunde
(74) *Attorney, Agent, or Firm* — NSIP Law

(57) ABSTRACT

Disclosed is a method and apparatus for face detection using an adaptive threshold. The method includes determining a detection box in an input image, calculating a confidence score indicating whether an object in the detection box corresponds to a face, setting an adaptive threshold based on a size of the detection box, and determining whether the object in the detection box corresponds to a face based on comparing the confidence score to the adaptive threshold.

20 Claims, 13 Drawing Sheets

Related U.S. Application Data

(60) Provisional application No. 62/934,594, filed on Nov. 13, 2019.

(56) References Cited

U.S. PATENT DOCUMENTS

| | | | |
|---|---|---|---|
| 11,688,199 B2 * | 6/2023 | Lee | G06V 40/161 |
| | | | 382/103 |
| 2016/0042289 A1 | 2/2016 | Poola et al. | |
| 2017/0032214 A1 | 2/2017 | Krenzer et al. | |
| 2019/0026563 A1 | 1/2019 | Pachauri | |
| 2019/0045203 A1 | 2/2019 | Varadarajan et al. | |
| 2019/0130580 A1 | 5/2019 | Chen et al. | |

FOREIGN PATENT DOCUMENTS

| | | |
|---|---|---|
| CN | 109614881 A | 4/2019 |
| CN | 115690526 A | 2/2023 |
| JP | 2007-165947 A | 6/2007 |
| JP | 2018-117280 A | 7/2018 |
| JP | 2018-180945 A | 11/2018 |
| KR | 10-2013-0043394 A | 4/2013 |
| KR | 10-2019-0046349 A | 5/2019 |

* cited by examiner

METHOD AND APPARATUS FOR FACE DETECTION USING ADAPTIVE THRESHOLD

CROSS-REFERENCE TO RELATED APPLICATIONS

This application is a continuation of U.S. patent application Ser. No. 17/075,164 filed on Oct. 20, 2020 which claims the benefit under 35 U.S.C. § 119 (e) of U.S. Provisional Application No. 62/934,594 filed on Nov. 13, 2019, in the U.S. Patent and Trademark Office, and claims the benefit under 35 U.S.C. § 119 (a) of Korean Patent Application No. 10-2020-0027948 filed on Mar. 5, 2020, in the Korean Intellectual Property Office, the entire disclosures, all of which, are incorporated herein by reference for all purposes.

BACKGROUND

1. Field

The following description relates to a method and apparatus for face detection using an adaptive threshold.

2. Description of Related Art

Face detection may be implemented using various techniques. For example, if an image is input by a camera, preprocessing such as resizing may be performed on the input image, and the preprocessed input image may be input into a convolutional neural network (CNN). Candidate face boxes and confidence scores of the respective candidate face boxes may be determined based on an output feature map of the CNN, and a candidate face box having a confidence score exceeding a threshold, among the candidate face boxes, may be determined to be a face box. Face detection may be used in various fields such as camera control and face recognition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a face detection method, including determining a detection box in an input image, calculating a confidence score indicating whether an object in the detection box corresponds to a face, setting an adaptive threshold based on a size of the detection box, and determining whether the object in the detection box corresponds to a face based on comparing the confidence score to the adaptive threshold.

The setting may include setting the adaptive threshold based on inputting the value of the size of the detection box into a threshold setting engine.

The threshold setting engine may be determined based on a distribution of sample values respectively indicating sample confidence scores according to sizes of sample detection boxes.

Each of the sample values may correspond to a true positive sample or a false positive sample, and the threshold setting engine may be configured to set the adaptive threshold using a function to distinguish the true positive sample and the false positive sample in the distribution.

Within a size range of the detection box, the adaptive threshold may be decreased, in response to the size of the detection box decreasing.

The setting may include setting the adaptive threshold based on the size of the detection box and a quality of the input image.

The face detection method may include calculating a quality of the input image.

The setting may include setting the adaptive threshold by inputting a value of the size of the detection box and a value of the quality of the input image into a threshold setting engine.

The value of the quality may be input into the threshold setting engine as a weight.

The weight may be configured to set an adaptive threshold for a low-quality image lower than an adaptive threshold for a high-quality image.

The calculating of the quality of the input image may include generating a down-sampled image of the input image, generating a reference image corresponding to a size of the input image by performing interpolation on the down-sampled image, and calculating the quality of the input image based on a difference between the input image and the reference image.

The quality of the input image may be determined based on any one or any combination of a resolution of the input image, a blur level of the input image, and a noise level of the input image.

The face detection method may include determining whether the object in the detection box corresponds to a face based on comparing the confidence score to at least one of a maximum threshold or a minimum threshold.

The face detection method may include performing any one or any combination of a camera control and a face recognition, in response to a determination that the face box may be present in the input image.

In another general aspect, there is provided a face detection apparatus, including a processor configured to determine a detection box in an input image, calculate a confidence score indicating whether an object in the detection box corresponds to a face, set an adaptive threshold based on a size of the detection box, and determine whether the object in the detection box corresponds to a face based on comparing the confidence score to the adaptive threshold.

The processor may be configured to set the adaptive threshold based on inputting the value of the size of the detection box into a threshold setting engine.

The threshold setting engine may be determined based on a distribution of sample values respectively indicating sample confidence scores according to sizes of sample detection boxes.

Within a size range of the detection box, the adaptive threshold may be decreased, in response to the size of the detection box decreasing.

The processor may be configured to set the adaptive threshold additionally based on a quality of the input image.

The processor may be configured to set the adaptive threshold by inputting a value of the size of the detection box and a value of the quality of the input image into a threshold setting engine, and the value of the quality may be input into the threshold setting engine as a weight.

The processor may be configured to generate an early detection result indicating whether the object in the detection box corresponds to a face, by comparing the confidence score to at least one of a maximum threshold or a minimum threshold.

The processor may be configured to use a compensation value to increase a confidence score of a low-quality image or to decrease a confidence score of a high-quality image, in response to an increase in the size of the detection box.

The processor may be configured to use a compensation value to increase a confidence score of a low-quality image or to decrease a confidence score of a high-quality image, in response to an increase in the size of the detection box.

The compensation value may be based on any one or any combination of the size of the detection box and the quality of the input image.

The face detection apparatus may include a memory configured to store instructions executable by the processor.

In another general aspect, there is provided a face detection apparatus, including a sensor configured to receive an image, and a processor configured to determine a detection box in the image, calculate a confidence score indicating whether an object in the detection box corresponds to a face, determine that the object in the detection box corresponds to a face, in response to the confidence score being greater than a maximum threshold, set an adaptive threshold based on a size of the detection box, and determine whether the object in the detection box corresponds to a face based on comparison of the confidence score to the adaptive threshold, in response to the confidence score being lesser than the maximum threshold.

The face detection apparatus may include discarding the detection box, in response to the confidence score being lesser than a minimum threshold.

Other features and aspects will be apparent from the following detailed description, the drawings, and the claims.

Figure 1:
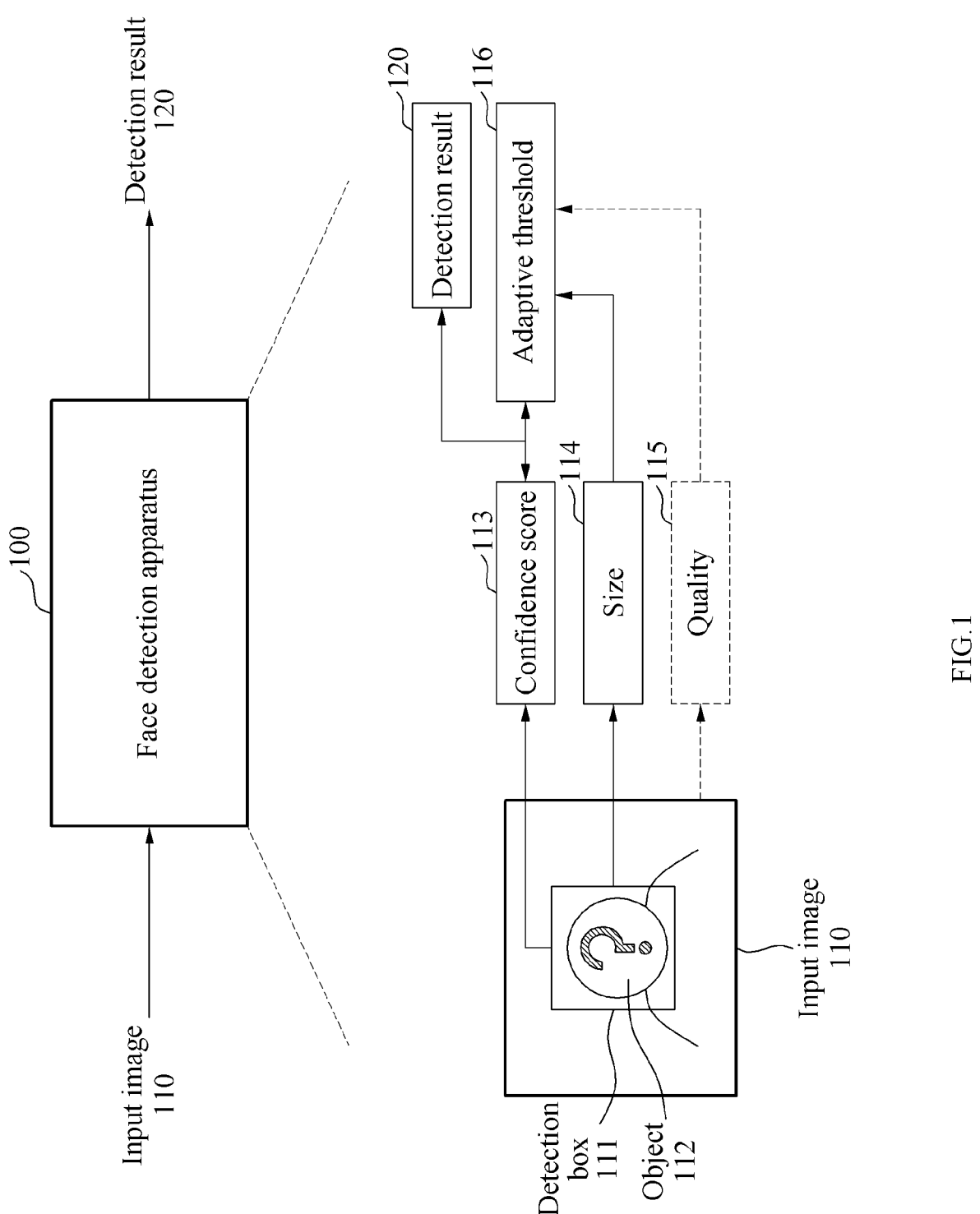
FIG. 1 illustrates an example of an operation of a face detection apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms of "first," "second," A, B, (a), (b) or the like are used to explain various components, the components are not limited to the terms. These terms should be used only to distinguish one component from another component. For example, a first component may be referred to as a second component, and similarly the second component may also be referred to as the first component without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, the examples will be described in detail with reference to the accompanying drawings. Like reference numerals in the drawings refer to like elements.

FIG. 1 illustrates an example of an operation of a face detection apparatus. Referring to FIG. 1, a face detection apparatus 100 receives an input image 110. The face detection apparatus 100 may detect a detection box 111 including an object 112 estimated as a face in the input image 110 and determine whether the object 112 in the detection box 111 corresponds to a face. If the object 112 in the detection box 111 corresponds to a face, the face detection apparatus 100 may determine the detection box 111 to be a face box. If the object 112 in the detection box 111 does not correspond to a face, the detection box 111 may be discarded.

If the face box is determined, the face detection apparatus 100 outputs a detection result 120 corresponding to the face box. The detection result 120 may include face box information, and the face box may be specified in the input image 110 through the face box information. For example, the face box information may include a reference coordinate value of the face box (for example, a coordinate value of one vertex of the face box) and a size value of the face box (for example, a diagonal length of the face box). The face box information is not limited thereto, and the face box may be specified in various manners. The detection result 120 may be used to control a camera generating the input image 110. For example, camera control may include auto-focus, auto-exposure, and auto-white balancing which are called 3As.

The face detection apparatus 100 may generate the detection result 120 by comparing a confidence score 113 to an adaptive threshold 116. It may be difficult to suppress false detection when a fixed threshold is used, which will be described below. False detection may include incorrectly detecting a face as a non-face (hereinafter, referred to as false negative), and incorrectly detecting a non-face as a face (hereinafter, referred to as false positive). The adaptive threshold 116 may be adjusted according to the box size and/or the image quality, and false detection may be greatly suppressed through the adaptive threshold 116.

In an example, the face detection apparatus 100 may calculate the confidence score 113 of the detection box 111, compare the confidence score 113 to the adaptive threshold 116, and generate the detection result 120 based on a result of the comparing. The confidence score 113 may indicate whether the object 112 in the detection box 111 corresponds to a face. For example, the confidence score 113 may indicate a probability that the object 112 corresponds to a face. A neural network-based face detector may be used for the detection of the detection box 111 and the calculation of the confidence score 113. In an example, a convolutional neural network (CNN) may be used.

The face detection apparatus 100 may set the adaptive threshold 116 based on the size 114 of the detection box 111. The confidence score 113 may decrease as the size 114 decreases, which will be described below. Based on such a characteristic, the face detection apparatus 100 may set the adaptive threshold 116 appropriate for the size 114. For example, the face detection apparatus 100 may set the adaptive threshold 116 to be small as the size 114 is small within a size range.

In another example, the face detection apparatus 100 may set the adaptive threshold 116 based on the size 114 of the detection box 111 and a quality 115. For example, the quality 115 may be determined based on any one or any combination of a resolution, a blur level, and a noise level. The quality 115 may be associated with the input image 110 or associated with the detection box 111. Hereinafter, the quality 115 will be representatively described as being associated with the input image 110. Further, the confidence score 113 may decrease as the quality 115 decreases, which will be described below. Based on such a characteristic, the face detection apparatus 100 may set the adaptive threshold 116 appropriate for the quality 115.

The quality 115 may be reflected in the adaptive threshold 116 in various manners. In an example, the adaptive threshold 116 may be set through a predesigned threshold setting engine. The threshold setting engine may be designed based on a distribution of scores of samples according to the box sizes of the samples. The samples may include face samples and non-face samples.

For example, the sample quality may be reflected in a score as a compensation value and affect the distribution of the scores according to the box sizes used to design the threshold setting engine. In this example, when deriving the detection result 120 using the predesigned threshold setting engine, the quality 115 may not be input separately into the threshold setting engine.

In another example, the sample quality of each sample may not be reflected in the distribution, and a weight corresponding to the sample quality may be applied to the threshold setting engine as a variable. In this example, when deriving the detection result 120 using the predesigned threshold setting engine, the quality 115 may be input into the threshold setting engine as a weight. For example, a great weight may be applied to the threshold setting engine as the quality 115 is low.

Figure 2:
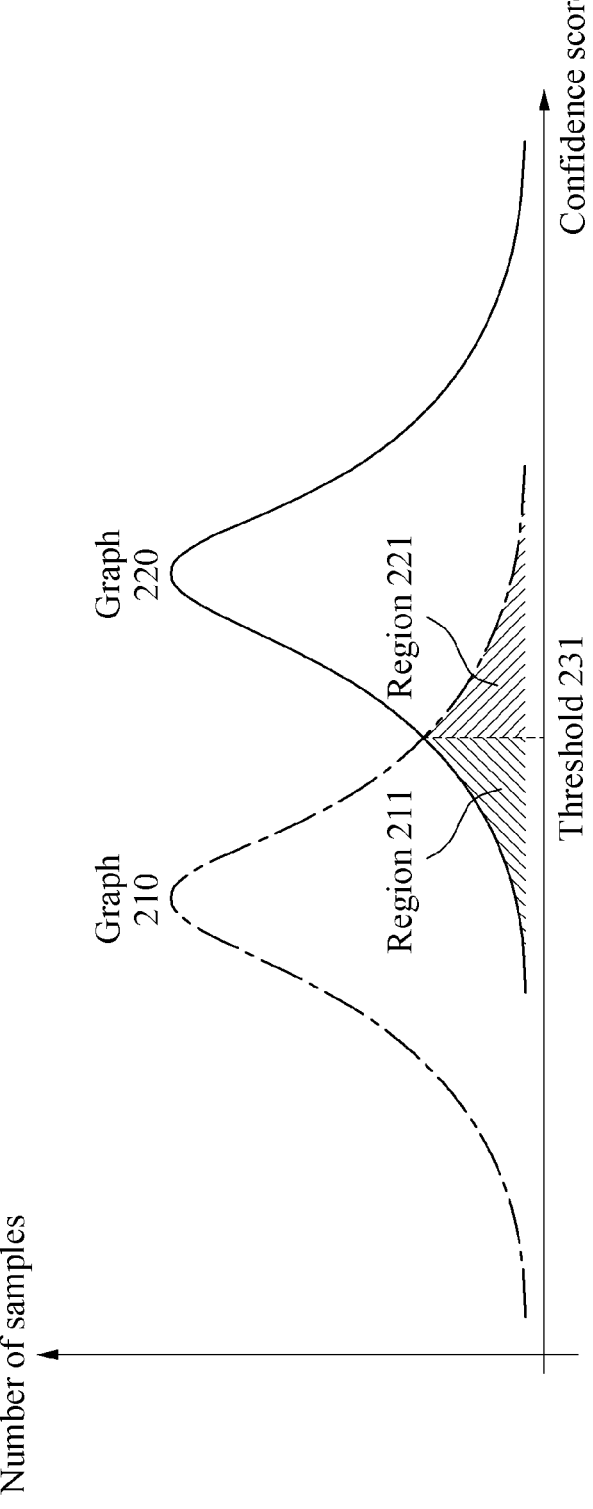
FIG. 2 illustrates an example of a possibility of false detection according to a fixed threshold.

FIG. 2 illustrates an example of a possibility of false detection according to a fixed threshold. Referring to FIG. 2, a graph 210 shows a distribution of confidence scores of non-face samples, and a graph 220 shows a distribution of confidence scores of face samples. In this example, a threshold 231 may be set based on the distributions of the confidence scores represented through the graph 210 and the graph 220. The threshold 231 may be set to be a fixed value. For example, the threshold 231 may be set to be a fixed value corresponding to a confidence score at which the graph 210 and the graph 220 overlap. In this example, face samples belonging to a region 211 may have confidence scores lower than the threshold 231 and thus, may be incorrectly detected as non-faces. Non-face samples belonging to a region 221 may have confidence scores higher than the threshold 231 and thus, may be incorrectly detected as faces. If the threshold 231 is specifically adjusted to be appropriate for the situation based on the box size or the quality, such a possibility of false detection may greatly decrease.

Figure 3:
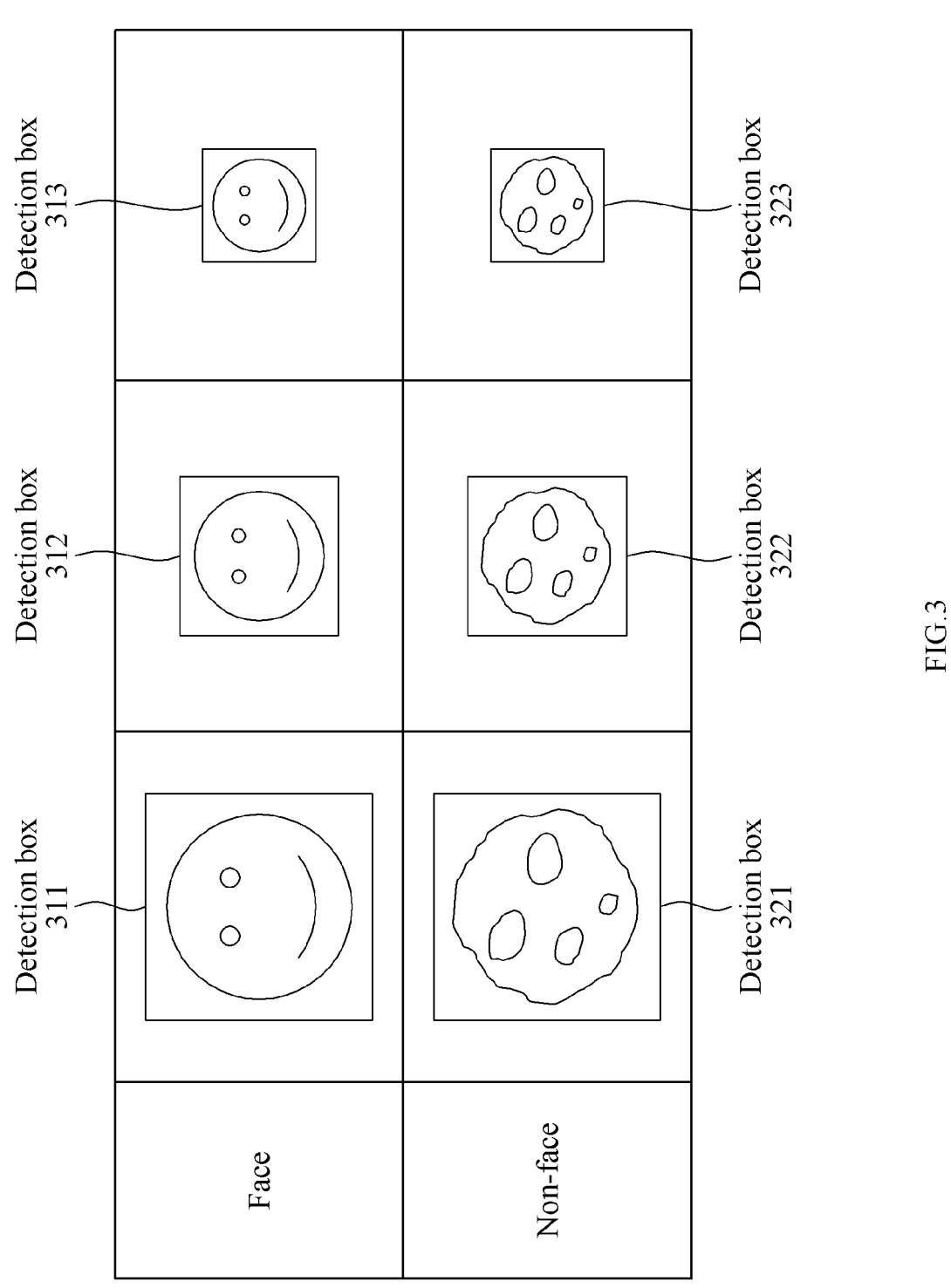
FIG. 3 illustrates examples of detection boxes including faces or non-faces, by size.

FIG. 3 illustrates examples of detection boxes including faces or non-faces, by size. Referring to FIG. 3, detection boxes 311, 312, and 313 correspond to faces, and detection boxes 321, 322, and 323 correspond to non-faces. For example, a confidence score corresponding to a certain box size may be defined as a size-score pair, which may be expressed as (box size, confidence score). For example, through an experiment, size-score pairs of the detection boxes 311, 312, and 313 may be derived as (238, 0.987), (175, 0.98), and (112, 0.951), and size-score pairs of the detection boxes 321, 322, and 323 may be derived as (250, 0.772), (205, 0.743), and (167, 0.669).

It is shown in all of the detection boxes 311, 312, and 313 corresponding to faces and the detection boxes 321, 322, and 323 corresponding to non-faces, the confidence score increases as the box size increases. Thus, in general, an adaptive threshold may be set to be great as the box size is great. Furthermore, comparing a face box and a non-face box that are similar in size, the face box has a greater confidence score than the non-face box. For example, the confidence score of the detection box 311 is greater than that of the detection box 321. Similar results may be derived from a comparison between the detection box 312 and the detection box 322 and a comparison between the detection box 313 and the detection box 323. Therefore, setting the adaptive threshold to be great as the box size is great may be effective at suppressing false detection.

Figure 4:
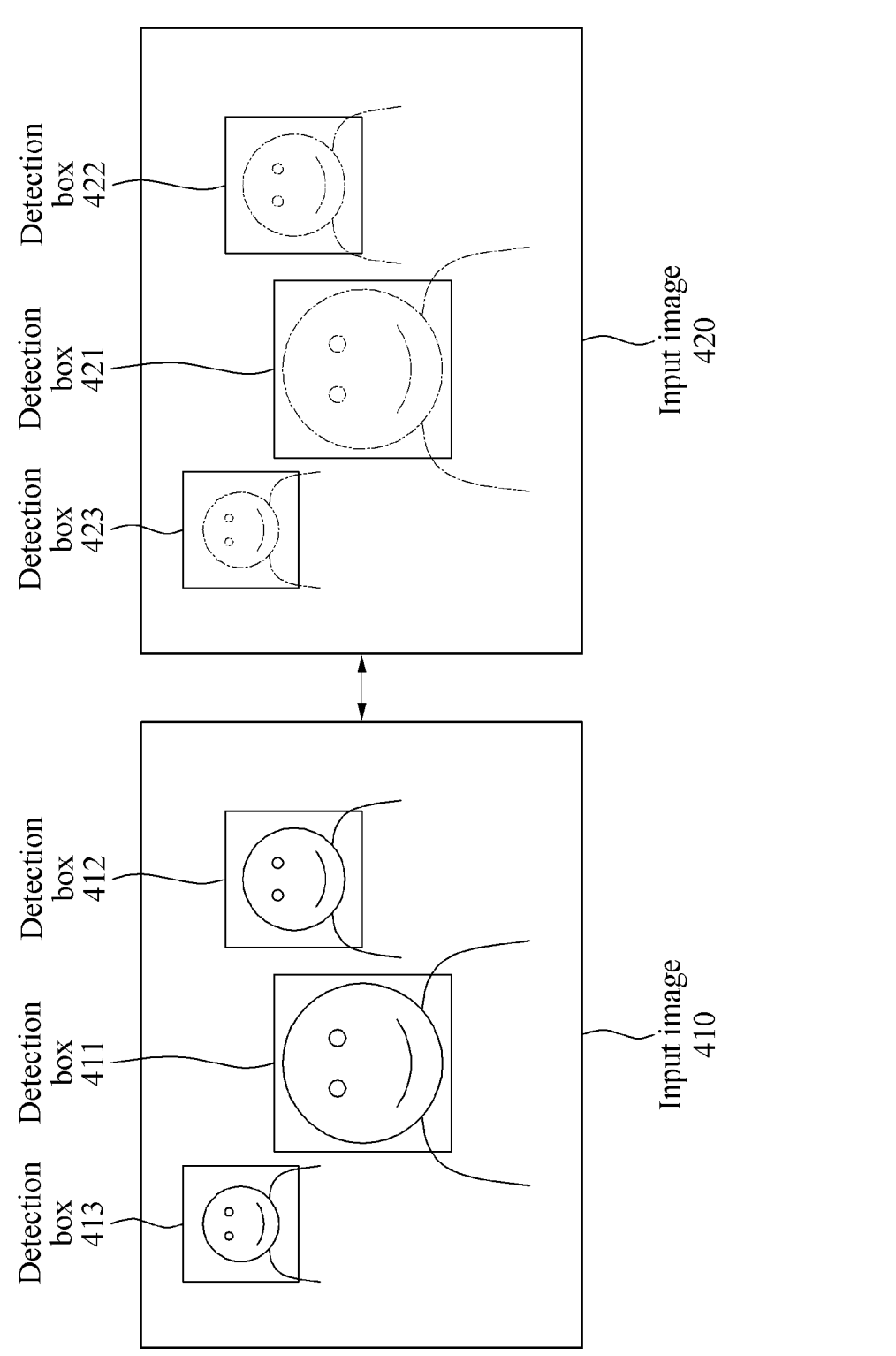
FIG. 4 illustrates examples of detection boxes of various sizes, detected in a high-quality input image and a low-quality input image.

FIG. 4 illustrates examples of detection boxes of various sizes, detected in a high-quality input image and a low-quality input image. Referring to FIG. 4, detection boxes 411, 412, and 413 are detected in a high-quality input image 410, and detection boxes 421, 422, and 423 are detected in a low-quality input image 420. The quality of an image may be calculated in various manners, and a low-resolution image, a blurry image, and a noisy image may be classified as low-quality images. For example, through an experiment, confidence scores of the detection boxes 411, 412, and 413 may be derived as 0.897, 0.871, and 0.835, and confidence scores of the detection boxes 421, 422, and 423 may be derived as 0.764, 0.827, and 0.799.

Comparing, by size, the confidence scores of the detection boxes 411, 412, and 413 corresponding to a high-quality image and the confidence scores of the detection boxes 421, 422, 423 corresponding to a low-quality image, a box corresponding to a high-quality image, between the boxes similar in size, has a greater confidence score. Thus, an appropriate compensation to increase a confidence score of a low-quality image or to decrease a confidence score of a high-quality image may be provided. If a weight is used, the weight may be designed such that an adaptive threshold for a low-quality image may be set to be low, or an adaptive threshold for a high-quality image may be set to be high.

Further, as the box size increases, a differential between the confidence score of the high-quality image and the confidence score of the low-quality image may increase greatly. Thus, a compensation value to further increase the confidence score of the low-quality image or to further decrease the confidence score of the high-quality image as the box size increases may be used. If a weight is used, the weight may be designed such that an adaptive threshold for a low-quality image may be set further to be low, or an adaptive threshold for a high-quality image may be set further to be high.

Figure 5:
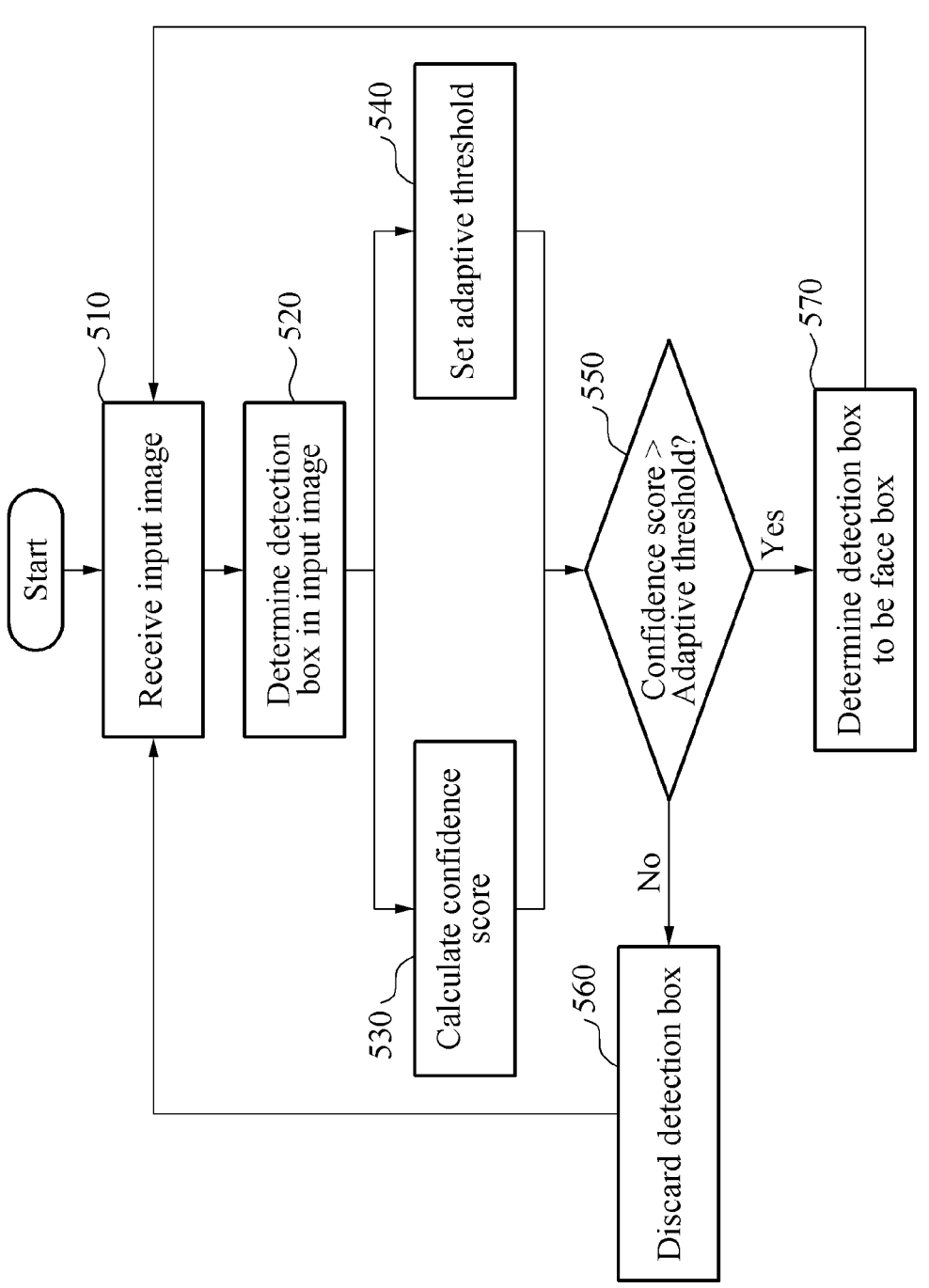
FIG. 5 illustrates an example of a face detection method.

FIG. 5 illustrates an example of a face detection method. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, a face detection apparatus receives an input image. For example, the input image may include a plurality of frames, and here, a first frame of the input image is received. After the first frame is processed, a second frame and a third frame may be processed sequentially, as described below.

In operation 520, the face detection apparatus determines a detection box in the input image. The detection box may include an object estimated to be a face. In operation 530, the face detection apparatus calculates a confidence score for the detection box. The confidence score may indicate whether the object in the detection box corresponds to a face. For example, the confidence score may indicate a probability that the object corresponds to a face.

In an example, the face detection apparatus may use a trained neural network-based face detector to determine the detection box and calculate the confidence score. For example, the face detector may include a CNN. The face detection apparatus may apply preprocessing such as resizing to the input image, and input the preprocessed input image into the face detector. Accordingly, the face detector may output the detection box and the confidence score of the detection box.

In operation 540, the face detection apparatus sets an adaptive threshold for the detection box. For example, within a size range of the detection box, the adaptive threshold may be set to be small as the size of the detection box is small. The size range may refer to a range from the size corresponding to a minimum threshold to the size corresponding to a maximum threshold. The face detection apparatus may set the adaptive threshold based on the size of the detection box, or may set the adaptive threshold based on the size of the detection box and the quality of the input image. Thus, a different threshold may be applied to each detection box based on the box size and/or the image quality. Operation 530 and operation 540 may be performed at the same time, or one of operation 530 and operation 540 may be performed first.

The face detection apparatus may set the adaptive threshold using a threshold setting engine. The threshold setting engine may be determined based on a distribution of a plurality of sample values respectively indicating confidence scores according to the sizes of the detection boxes. The face detection apparatus may input the value of the size of a detection box into the threshold setting engine as input data, or input the value of the quality of the input image into the threshold setting engine as input data.

For example, the value of the quality of the input image may be used as a sort of weight for setting a threshold. For example, the weight may be designed such that an adaptive threshold for a low-quality image may be set to be low, or an adaptive threshold for a high-quality image may be set to be high. The weight may also be designed such that an adaptive threshold for a low-quality image may be set to be low, and an adaptive threshold for a high-quality image may be set to be high. The threshold setting engine will be described in detail later.

In operation 550, the face detection apparatus may compare the confidence score to the adaptive threshold to determine whether the object in the detection box corresponds to a face. If the confidence score is less than the adaptive threshold, operation 560 may be performed. In operation 560, the face detection apparatus may discard the detection box. If the confidence score is greater than the adaptive threshold, operation 570 may be performed. In operation 570, the face detection apparatus may determine the detection box to be a face box.

In response to the determination that there is a face box in the input image through operation 570, a variety of postprocessing associated with the face box may be performed. For example, the postprocessing may include camera control and face recognition. For example, auto-focus, auto-exposure, and auto-white balancing, called 3As, may be performed based on the face box. After operations 560 and 570 are performed, operation 510 may be performed on a subsequent frame (for example, the second frame).

Figure 6:
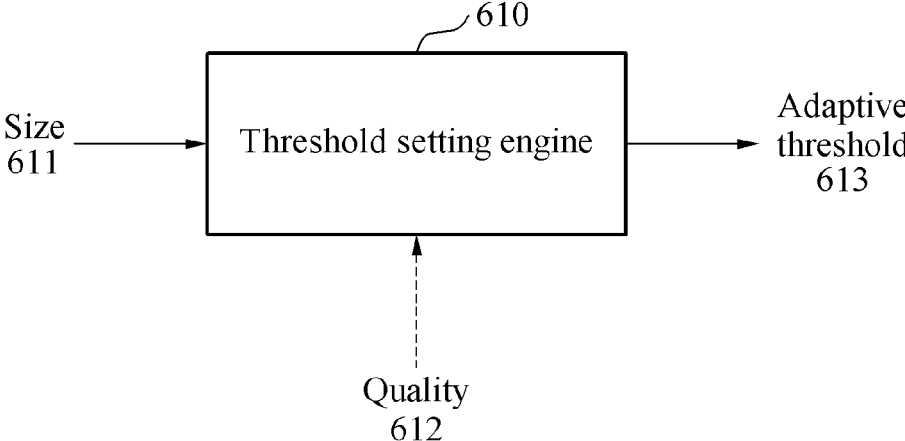
FIG. 6 illustrates an example of an operation of a threshold setting engine.

FIG. 6 illustrates an example of an operation of a threshold setting engine. A threshold setting engine 610 may be designed to set an adaptive threshold 613 appropriate for input data. The input data may include a size 611 of a box, or include the size 611 of the box and a quality 612 of an image. For example, the threshold setting engine 610 may determine the adaptive threshold 613 appropriate for the size 611, in response to the size 611 being input. In another example, the threshold setting engine 610 may determine the adaptive threshold 613 appropriate for the size 611 and the quality 612, in response to the size 611 and the quality 612 being input.

The threshold setting engine 610 may be predesigned based on a distribution of a plurality of sample values respectively indicating sample confidence scores according to the sizes of sample detection boxes. The threshold setting engine 610 may be designed to include a function (for example, a linear function or an exponential function) to distinguish a face sample and a non-face sample in the distribution of the sample values. In another example, the threshold setting engine 610 may be designed in a manner of calculating thresholds for a plurality of intervals and performing interpolation between the thresholds. Hereinafter, a process of designing the threshold setting engine 610 will be described further in detail.

Figure 7:
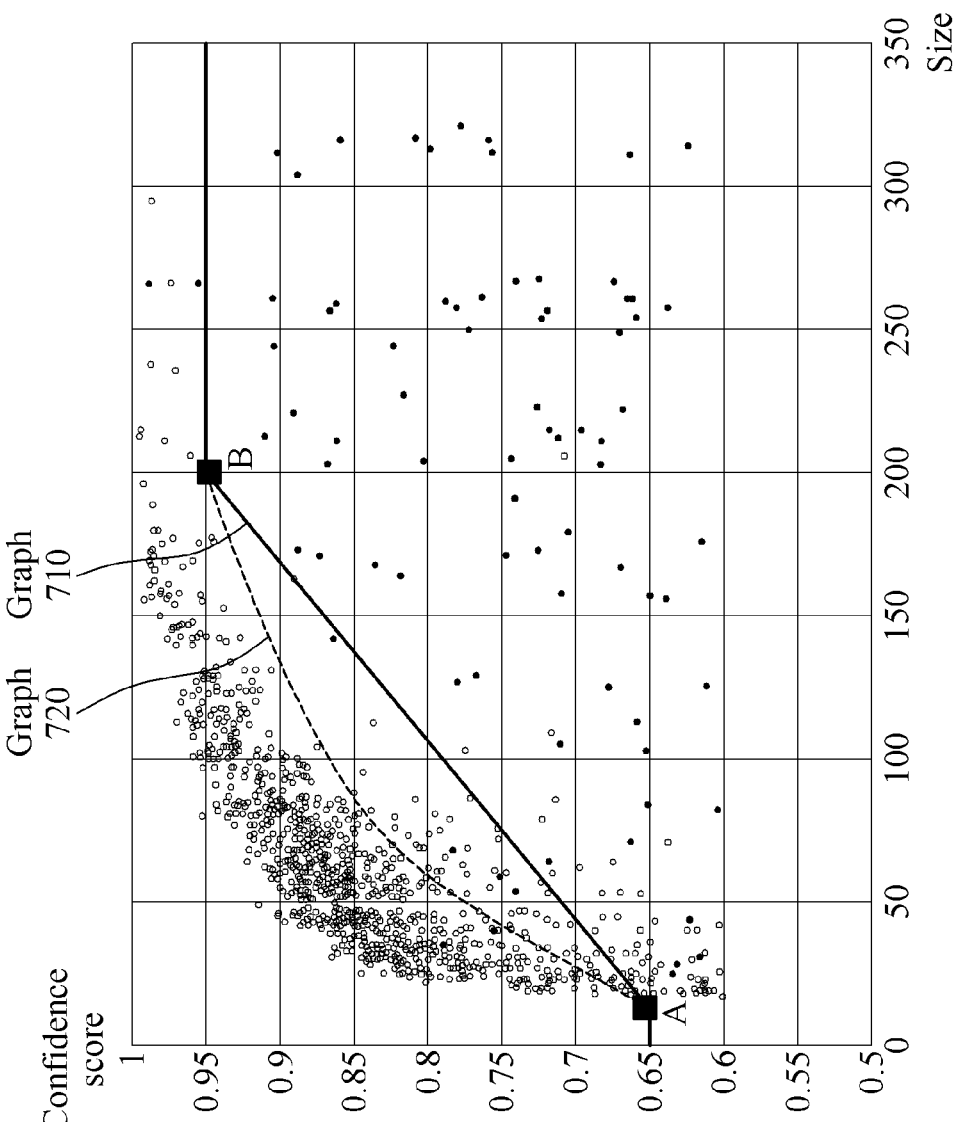
FIG. 7 illustrates an example of a process of designing a threshold setting engine.
Figure 7:

FIG. 7 illustrates an example of a process of designing a threshold setting engine. Referring to FIG. 7, there are shown points corresponding to a plurality of sample values. The sample values may correspond to true positive samples or false positive samples. If a detection box of a sample including a face is determined to be a face box, the sample corresponds to a true positive sample. When a detection box of a sample not including a face (that is, including a non-face) is determined to be a face box, the sample corresponds to a false positive sample. Each sample value may include a size value and a confidence score. Thus, the points in FIG. 7 may indicate a distribution of sample confidence scores according to the sizes of sample detection boxes.

A function to distinguish a true positive sample and a false positive sample in this distribution may be defined. For example, the function may include a first-order function and an exponential function. A graph 710 and a graph 720 respectively distinguish a true positive sample and a false positive sample in a given interval AB. The graph 710 may correspond to a first-order function, and the graph 720 may correspond to an exponential function. The first-order function may be defined as expressed by Equation 1, and the exponential function may be defined as expressed by Equation 2.

$$y = ax + b \qquad \text{[Equation 1]}$$

$$y = \frac{be^{ax}}{1 + e^{ax}} \qquad \text{[Equation 2]}$$

In Equation 1 and Equation 2, x denotes the size, and y denotes the confidence score. The value of a and the value of b may be determined such that a true positive sample and a false positive sample may be distinguished according to a given performance index, for example, a false acceptance rate (FAR). Since true positive samples have a curved distribution, the exponential function may be advantageous if a high-performance index is required.

The function may be defined for a range, for example, the interval AB. For example, if the coordinates of a point A are (20, 0.65) and the coordinates of a point B are (200, 0.95), the function may be defined with respect to the size range of 20 to 200. The size range may correspond to a confidence score range of 0.65 to 0.95. In this example, the minimum confidence score and the maximum confidence score in the range in which the function is defined may indicate a maximum threshold and a minimum threshold, respectively. For example, in FIG. 7, 0.65 may indicate the minimum threshold, and 0.95 may indicate the maximum threshold.

The maximum threshold and the minimum threshold may be used to generate an early detection result, which will be described later. A detection box having a confidence score less than the minimum threshold indicates that the detection box is very unlikely to correspond to a face and thus, may be discarded immediately without considering the adaptive threshold. Further, a detection box having a confidence score greater than the maximum threshold indicates that the detection box is very likely to correspond to a face and thus, may be determined immediately to be a face box without considering the adaptive threshold.

When designing the threshold setting engine, the quality of samples may be considered. For example, the quality of samples may be used for compensation with respect to confidence scores. In this example, a compensation value according to the quality may be applied to a confidence score of each sample. By applying the compensation value, the distribution of samples may be adjusted. For example, FIG. 7 shows the distribution before the compensation is reflected, and the distribution in FIG. 7 may be adjusted if the compensation is reflected, such that a true positive sample and a false positive sample may be distinguished more clearly in the adjusted distribution. That is, if the compensation value is applied, a true positive sample and a false positive sample may be distinguished more easily.

The quality level may be considered when setting the compensation value. For example, the compensation value may be set to increase a confidence score of a low-quality image or to decrease a confidence score of a high-quality image. Since a low quality may result in a low confidence score, such a result may be alleviated by adjusting the confidence score through the compensation value. The compensation value may be set to increase a confidence score of a low-quality image and to decrease a confidence score of a high-quality image.

Further, the box size may be additionally used when setting the compensation value. That is because a differential between the confidence score of the high-quality image and the confidence score of the low-quality image may increase greatly as the box size increases. For example, the compensation value may be set to further increase the confidence score of the low-quality image or to further decrease the confidence score of the high-quality image as the box size increases. The compensation value may also be designed to further increase the confidence score of the low-quality image and to further decrease the confidence score of the high-quality image as the box size increases.

A compensation function may be defined to set the compensation value. The compensation function may receive the value of the quality or receive the value of the quality and the box size, and output the compensation value. The principles described above may be considered to design the compensation function.

In another example, the quality of samples may serve as a weight for the threshold setting engine. In this example, Equations 1 and 2 may be modified as in Equations 3 and 4.

$$y = w(ax + b) \qquad \text{[Equation 3]}$$

$$y = w\frac{be^{ax}}{1 + e^{ax}} \qquad \text{[Equation 4]}$$

In Equation 3 and Equation 4, w denotes a weight. The weight may be set such that an adaptive threshold for a low-quality image may be set to be low, or an adaptive threshold for a high-quality image may be set to be high. Since a low quality may result in a low confidence score, such a result may be alleviated by adjusting the threshold through the weight. The weight may also be set such that an adaptive threshold for a low-quality image may be set to be low, and an adaptive threshold for a high-quality image may be set to be high.

The weight may be set such that an adaptive for a low quality image may be set lower, or an adaptive threshold for a high quality image may be set higher. That is because a differential between the confidence score of the high-quality image and the confidence score of the low-quality image may increase as the box size increases. The weight may be set such that an adaptive threshold for a low-quality image may be set lower, and an adaptive threshold for a high-quality image may be set higher.

A weight function may be defined to set the weight. The weight function may receive the value of the quality or receive the value of the quality and the box size, and output the weight value. The principles described above may be considered to design the weight function.

Figure 8:
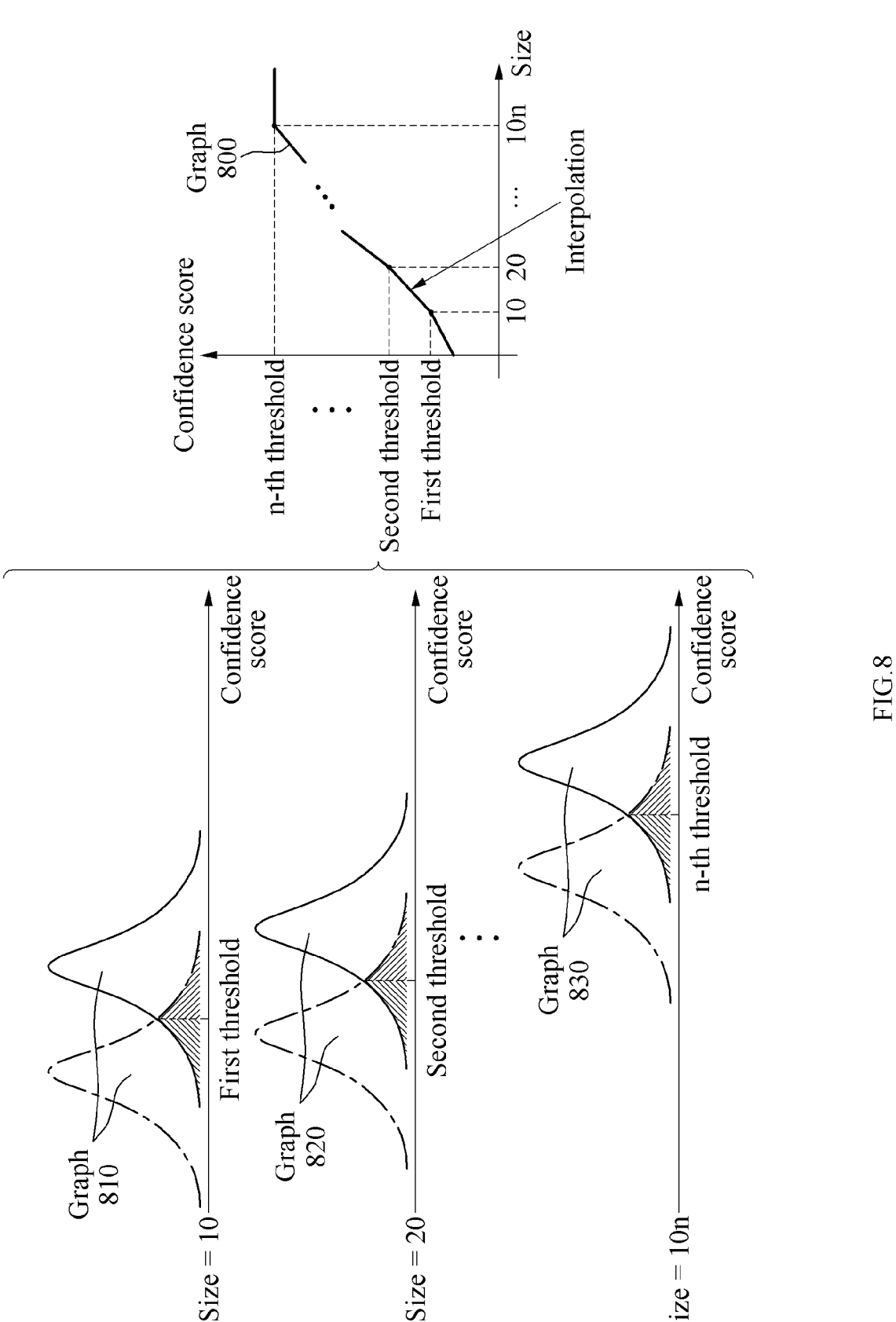
FIG. 8 illustrates an example of a process of designing a threshold setting engine.

FIG. 8 illustrates an example of a process of designing a threshold setting engine. Referring to FIG. 8, reference thresholds for reference sizes may be determined, and a function may be defined according to interpolation related to the reference thresholds. A graph 800 corresponds to a function defined through this process.

For example, for the reference sizes 10, 20, . . . , 10n, a first threshold, a second threshold, . . . , an n-th threshold may be determined according to the reference sizes. Each threshold may be determined based on a given performance index (for example, FAR). For example, graphs 810, 820, and 830 for the reference sizes are shown, and respective thresholds may be determined based on the sizes of regions where false detection occurs. Interpolation may be performed based on the thresholds to define the function corresponding to the graph 800. The above description of the quality may also apply to the example of FIG. 8. For example, the function may be defined after the quality data is reflected (for example, compensated for) in the confidence score in advance, or the quality data may be applied to the function as a weight after the function is defined.

Figure 9:
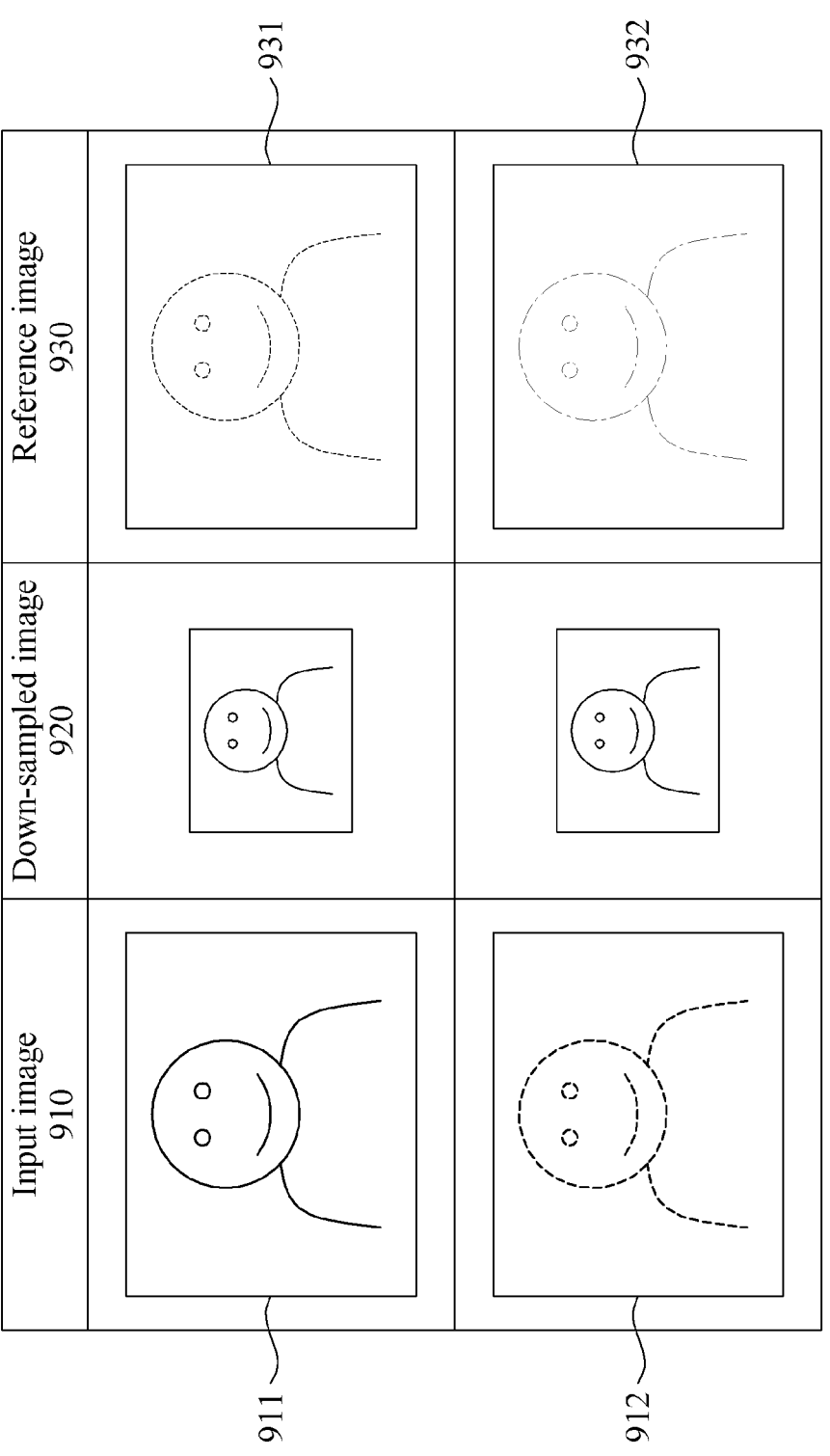
FIG. 9 illustrates an example of a quality calculating process.

FIG. 9 illustrates an example of a quality calculating process. Referring to FIG. 9, a down-sampled image 920 is generated by down-sampling an input image 910, and a reference image 930 is generated by performing interpolation on the down-sampled image 920. In an example, nearest-neighbor interpolation is performed. The size of the reference image 930 may correspond to the size of the input image 910. The quality of the input image 910 may be calculated based on a difference between the input image 910 and the reference image 930. For example, the difference may be calculated through L1 Norm.

The quality of the input image 910 may be determined to be higher as the difference is greater. For example, an input image 911 may correspond to a high-quality image, and an input image 912 may correspond to a low-quality image. In this example, a difference between the input image 911 and a reference image 931 may be greater than a difference between the input image 912 and a reference image 932. That is because there occurs a greater loss of information resulting from down-sampling. Thus, the input image 911 with a relatively great difference may be determined to be a relatively high-quality image, and the input image 912 with a relatively lesser difference may be determined to be a relatively low-quality image. Quality calculation is not necessarily limited to the example above, and may be performed in various other manners.

Figure 10:
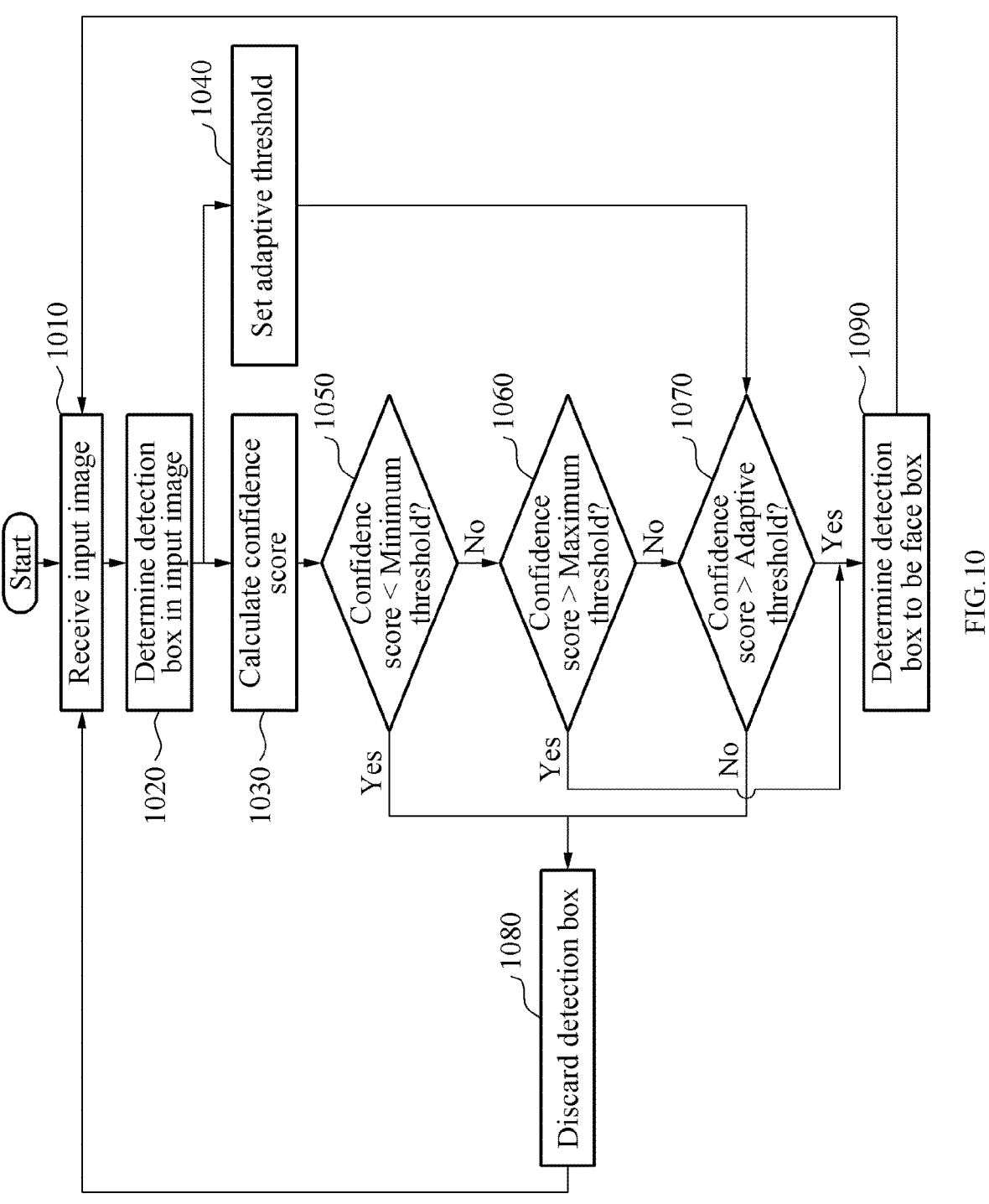
FIG. 10 illustrates an example of a face detection method.

FIG. 10 illustrates an example of a face detection method. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer, such as a processor, that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here.

As described above, an early detection result may be generated by comparing a confidence score to at least one of a preset maximum threshold and a preset minimum threshold. The early detection result may be different from the detection result 120 of FIG. 1, and may be generated earlier than the detection result 120. For example, a detection box having a confidence score less than the minimum threshold indicates that the detection box is very unlikely to correspond to a face and thus, may be discarded immediately without considering the adaptive threshold. Further, a detection box having a confidence score greater than the maximum threshold indicates that the detection box is very likely to correspond to a face and thus, may be determined immediately to be a face box without considering the adaptive threshold. In detail, the early detection result may be generated through operations described below.

Referring to FIG. 10, a face detection apparatus receives an input image in operation 1010, and determines a detection box in the input image in operation 1020. In operation 1030, the face detection apparatus calculates a confidence score for the detection box. In operations 1050 and 1060, the face detection apparatus attempts to generate an early detection result. If the confidence score is less than the minimum threshold, the face detection apparatus may discard the detection box in operation 1080. If the confidence score is greater than the maximum threshold, the face detection apparatus may determine the detection box to be a face box in operation 1090.

The face detection apparatus sets an adaptive threshold for the detection box in operation 1040, and determines whether an object included in the detection box corresponds to a face by comparing the confidence score to the adaptive threshold in operation 1070. If the confidence score is less than the adaptive threshold, operation 1080 may be performed. If the confidence score is greater than the adaptive threshold, operation 1090 may be performed. If any one of operations 1050 and 1060 is determined to be true, operations 1040 and 1070 may not be performed. If a detection result is generated through operation 1070, the detection result may correspond to the detection result 120 of FIG. 1. If a detection result is generated not through operation 1070, the detection result may correspond to an early detection result. In addition, the description provided with reference to FIG. 5 may apply to the face detection method of FIG. 10.

Figure 11:
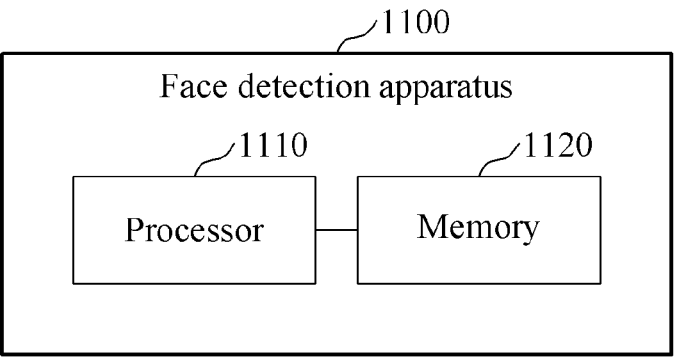
FIG. 11 illustrates an example of a face detection apparatus.

FIG. 11 illustrates an example of a face detection apparatus. Referring to FIG. 11, a face detection apparatus 1100 includes a processor 1110 and a memory 1120. The memory 1120 is connected to the processor 1110 and may store instructions executable by the processor 1110, data to be computed by the processor 1110, or data processed by the processor 1110. The memory 1120 may include non-transitory computer-readable media such as high-speed random-access memory and/or non-volatile computer-readable storage media, for example, one or more disk storage devices, flash memory devices, or other non-volatile solid-state memory devices.

The processor 1110 may execute instructions for performing the one or more operations described with reference to FIGS. 1 through 10. For example, the processor 1110 may determine a detection box in an input image, calculate a confidence score indicating whether an object in the detection box corresponds to a face, sets an adaptive threshold based on the size of the detection box, and determine whether the object in the detection box corresponds to a face by comparing the confidence score to the adaptive threshold.

Figure 12:
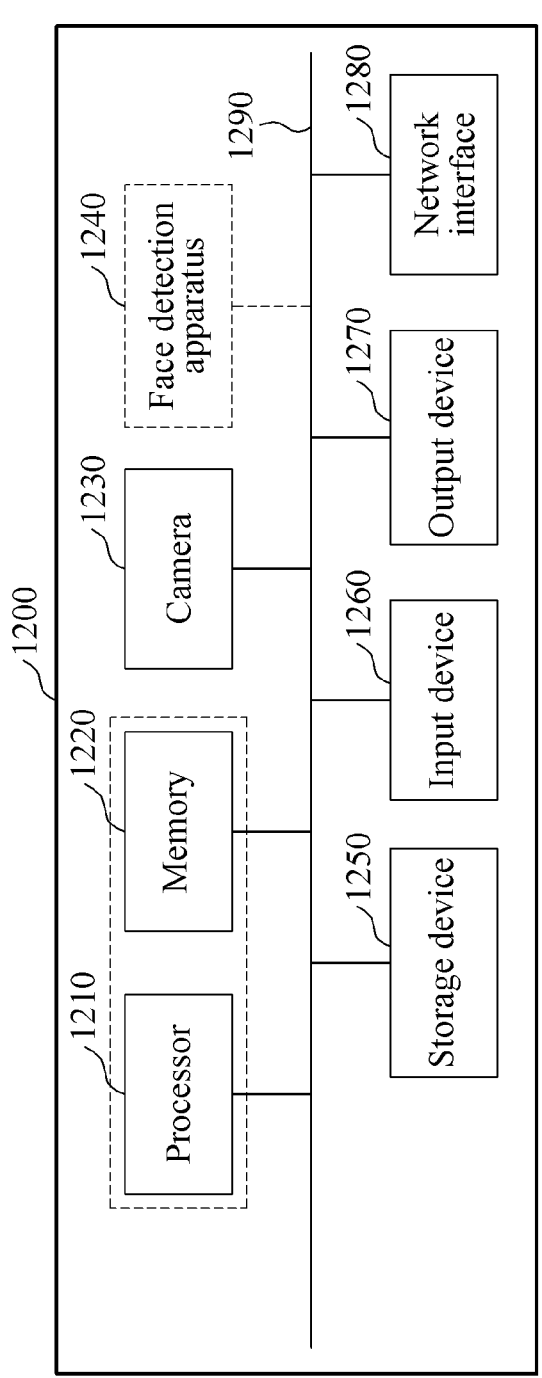
FIG. 12 illustrates an example of an electronic device.

FIG. 12 illustrates an example of an electronic device. Referring to FIG. 12, an electronic device 1200 may include a processor 1210, a memory 1220, a camera 1230, a storage device 1250, an input device 1260, an output device 1270, and a network interface 1280. The processor 1210, the memory 1220, the camera 1230, the storage device 1250, the input device 1260, the output device 1270, and the network interface 1280 may communicate with each other through a communication bus 1290.

For example, the electronic device 1200 may be implemented as at least a part of a mobile device such as a mobile phone, a smart phone, a PDA, a netbook, a tablet computer or a laptop computer, a wearable device such as a smart watch, a smart band or smart glasses, an electronic product, such as a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, various Internet of Things (IoT) devices, a computing device such as a desktop or a server, a home appliance such as a television, a smart television, a refrigerator, a smart home device, a security device such as a door lock, or a vehicle such as a smart vehicle, an automatic or autonomous driving system, an advanced driver assistance system (ADAS), or any other device capable of wireless communication or network communication consistent with that disclosed herein.

The electronic device 1200 may acquire an input image and detect a face box from the acquired input image. Further, the electronic device 1200 may perform operations associated with the detected face box. The electronic device 1200 may structurally and/or functionally include the face detection device 100 of FIG. 1. For example, the electronic device 1200 may functionally include the face detection device 100 of FIG. 1 through the processor 1210 and the memory 1220, or structurally include a face detection apparatus 1240 corresponding to the face detection device 100 of FIG. 1.

The processor 1210 executes instructions or functions to be executed in the electronic device 1200. For example, the processor 1210 may process the instructions stored in the memory 1220 or the storage device 1240. The processor 1210 may perform the one or more operations described through FIGS. 1 to 11. Further details regarding the processor 1210 is provided below.

The memory 1220 stores data for face detection. The memory 1220 may include a computer-readable storage medium or a computer-readable storage device. The memory 1220 may store instructions to be executed by the processor 1210 and may store related information while software and/or an application is executed by the electronic device 1200. Further details regarding the memory 1220 is provided below.

The camera 1230 may capture a photo and/or a video. For example, the camera 1230 may capture a face image including a face of a user. The camera 1230 may provide a 3D image including depth information related to objects.

The storage device 1250 includes a computer-readable storage medium or computer-readable storage device. The storage device 1250 may store a variety of data to be used in the face detection process, such as a face detector or a threshold determination engine. The storage device 1250 may store a more quantity of information than the memory 1220 for a long time. For example, the storage device 1250 may include a magnetic hard disk, an optical disk, a flash memory, a floppy disk, or other non-volatile memories known in the art.

The input device 1260 may receive an input from the user in traditional input manners through a keyboard and a mouse, and in new input manners such as a touch input, a voice input, and an image input. For example, the input device 1260 may include a keyboard, a mouse, a touch screen, a microphone, or any other device that detects the input from the user and transmits the detected input to the electronic device 1200.

The output device 1270 may provide an output of the electronic device 1200 to the user through a visual, auditory, or tactile channel. The output device 1270 may include, for example, a display, a touch screen, a speaker, a vibration generator, or any other device that provides the output to the user. In an example, the output device 1270 is a physical structure that includes one or more hardware components that provide the ability to render a user interface, render a display, and/or receive user input. The output device 1270 is not limited to the example described above, and any other displays, such as, for example, computer monitor and eye glass display (EGD) that are operatively connected to the electronic device 1200 may be used without departing from the spirit and scope of the illustrative examples described. The network interface 1280 may communicate with an external device through a wired or wireless network.

Figure 13:
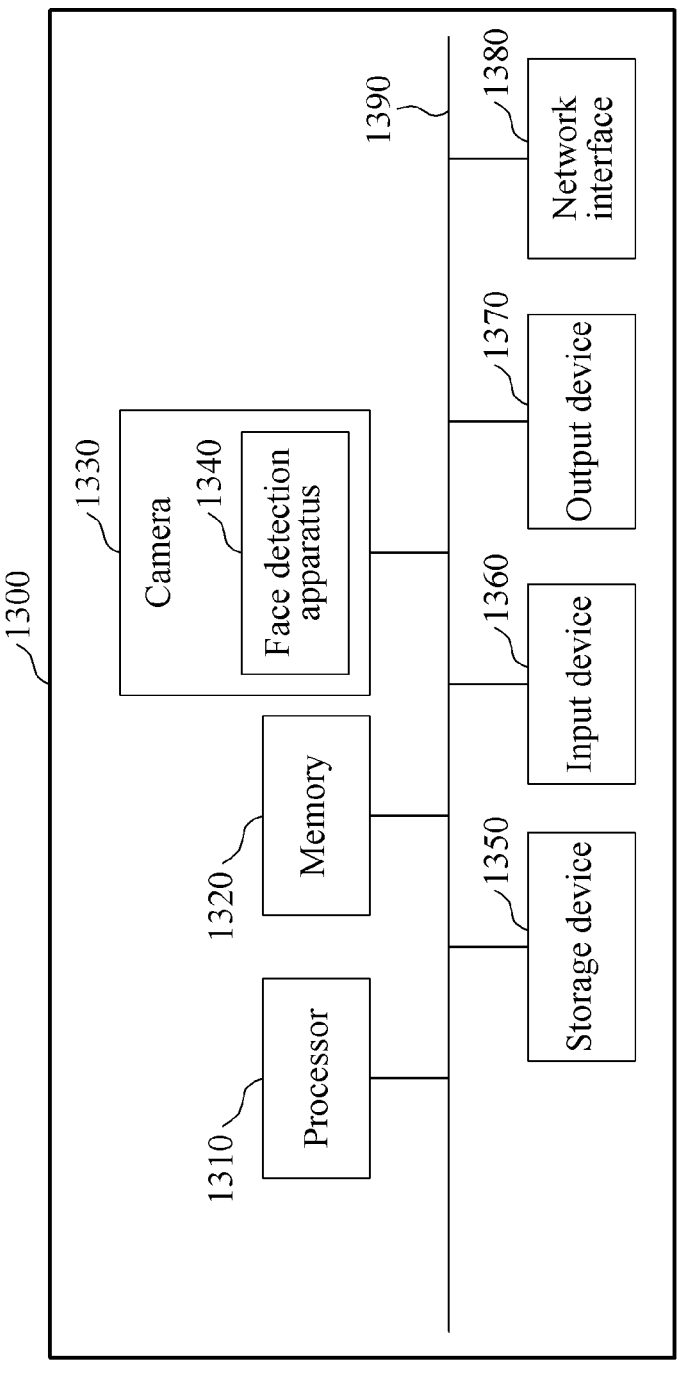
FIG. 13 illustrates an example of an electronic device.

FIG. 13 illustrates an example of an electronic device. Referring to FIG. 13, an electronic device 1300 may include a processor 1310, a memory 1320, a camera 1330, a storage device 1350, an input device 1360, an output device 1370, and a network interface 1380. The processor 1310, the memory 1320, the camera 1330, the storage device 1350, the input device 1360, the output device 1370, and the network interface 1380 may communicate with each other through a communication bus 1390. In addition to the description of FIG. 13 below, the descriptions of FIGS. 11-12 are also applicable to FIG. 13, and are incorporated herein by reference. Thus, the above description may not be repeated here.

The camera 1330 may include a face detection apparatus 1340. For example, the camera 1330 may include the face detection apparatus 1340 as one or more modules. A result of face detection of the face detection apparatus 1340 may be used to control the camera 1330. For example, the control of the camera 1330 may include auto-focus, auto-exposure, and auto-white balancing, which is referred to as 3A. The face detection apparatus 1340 may include, for example, a processor (for example, the processor 1110 of FIG. 11), and generate the face detection result using the processor. Further, the camera 1330 may be controlled based on the face detection result generated as described above. Accordingly, the face detection and the control of the camera 1330 may be performed without intervention from the processor 1310 or with minimal intervention from the processor 1310.

The face detection apparatus 100, face detection apparatus 1100, face detection apparatus 1240, face detection apparatus 1340, threshold setting engine 610, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, sub-tractors, multipliers, dividers, integrators, and any other electronic components configured to perform the operations described in this application. In other examples, one or more of the hardware components that perform the operations described in this application are implemented by computing hardware, for example, by one or more processors or com-puters. A processor or computer may be implemented by one or more processing elements, such as an array of logic gates, a controller and an arithmetic logic unit, a digital signal processor, a microcomputer, a programmable logic control-ler, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or com-puter may execute instructions or software, such as an operating system (OS) and one or more software applica-tions that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hard-ware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configu-rations, examples of which include a single processor, independent processors, parallel processors, single-instruc-tion single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central process-ing unit (CPU), a graphics processing unit (GPU), a neural processing unit (NPU), or any other device capable of responding to and executing instructions in a defined man-ner.

The methods that perform the operations described in this application are performed by computing hardware, for example, by one or more processors or computers, imple-mented as described above executing instructions or soft-ware to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or com-puter to implement the hardware components and perform the methods as described above are written as computer programs, code segments, instructions or any combination thereof, for individually or collectively instructing or con-figuring the processor or computer to operate as a machine or special-purpose computer to perform the operations per-formed by the hardware components and the methods as described above. In an example, the instructions or software includes at least one of an applet, a dynamic link library (DLL), middleware, firmware, a device driver, an applica-tion program storing the face detection method. In another example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and per-form the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data struc-tures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:
a camera configured to generate an input image; and
a processor configured to:
determine a detection box in an input image;
calculate a confidence score indicating whether an object in the detection box corresponds to a face;
set an adaptive threshold based on a quality of the input image; and
determine whether the object in the detection box corresponds to a face based on comparing the confidence score to the adaptive threshold.

2. The electronic device of claim 1, wherein the processor is further configured to set the adaptive threshold by inputting a value of the quality of the input image into a threshold setting engine.

3. The electronic device of claim 2, wherein the value of the quality is input into the threshold setting engine as a weight.

4. The electronic device of claim 3, wherein the weight is configured to set an adaptive threshold for a low-quality image lower than an adaptive threshold for a high-quality image.

5. The electronic device of claim 1, further comprising: calculating the quality of the input image.

6. The electronic device of claim 5, wherein the processor is further configured to:
generate a down-sampled image of the input image;
generate a reference image corresponding to a size of the input image by performing interpolation on the down-sampled image; and
calculate the quality of the input image based on a difference between the input image and the reference image.

7. The electronic device of claim 1, wherein the quality of the input image is determined based on any one or any combination of a resolution of the input image, a blur level of the input image, and a noise level of the input image.

8. The electronic device of claim 1, wherein the processor is further configured to:
determine whether the object in the detection box corresponds to a face based on comparing the confidence score to at least one of a maximum threshold or a minimum threshold.

9. The electronic device of claim 1, wherein the processor is further configured to:
perform any one or any combination of a camera control and a face recognition, in response to a determination that the face box is present in the input image.

10. A face detection method, comprising:
determining a detection box in an input image;
calculating a confidence score indicating whether an object in the detection box corresponds to a face;
setting an adaptive threshold based on a quality of the input image; and
determining whether the object in the detection box corresponds to a face based on comparing the confidence score to the adaptive threshold.

11. The face detection method of claim 10, wherein the setting comprises setting the adaptive threshold by inputting a value of the size of the detection box and a value of the quality of the input image into a threshold setting engine.

12. The face detection method of claim 11, wherein the value of the quality is input into the threshold setting engine as a weight.

13. The face detection method of claim 12, wherein the weight is configured to set an adaptive threshold for a low-quality image lower than an adaptive threshold for a high-quality image.

14. The face detection method of claim 10, further comprising:
calculating the quality of the input image.

15. The face detection method of claim 14, wherein the calculating of the quality of the input image comprises:
generating a down-sampled image of the input image;
generating a reference image corresponding to a size of the input image by performing interpolation on the down-sampled image; and
calculating the quality of the input image based on a difference between the input image and the reference image.

16. The face detection method of claim 10, wherein the quality of the input image is determined based on any one or any combination of a resolution of the input image, a blur level of the input image, and a noise level of the input image.

17. The face detection method of claim 10, further comprising:
determining whether the object in the detection box corresponds to a face based on comparing the confidence score to at least one of a maximum threshold or a minimum threshold.

18. The face detection method of claim 10, further comprising:
performing any one or any combination of a camera control and a face recognition, in response to a determination that the face box is present in the input image.

19. A non-transitory computer-readable storage medium storing instructions that, when executed by a processor, cause the processor to perform the face detection method of claim 10.

20. A face detection apparatus, comprising:
a processor configured to:
determine a detection box in an input image,
calculate a confidence score indicating whether an object in the detection box corresponds to a face,
set an adaptive threshold based on a quality of the input image, and
determine whether the object in the detection box corresponds to a face based on comparing the confidence score to the adaptive threshold.

* * * * *